United States Patent [19]

McVicar

[11] Patent Number: 4,767,038
[45] Date of Patent: Aug. 30, 1988

[54] SUPPORT FOR A SPARE WHEEL OF A MOTOR VEHICLE

[76] Inventor: Cameron C. McVicar, 1-611 St. Annes Road, Winnipeg, Manitoba, Canada, R2M 5K3

[21] Appl. No.: 9,700

[22] Filed: Feb. 2, 1987

[51] Int. Cl.⁴ .............................................. B62D 43/00
[52] U.S. Cl. .............................. 224/42.06; 224/42.12; 414/463
[58] Field of Search ................. 224/42.12, 42.2, 42.21, 224/42.25, 42.08, 42.06; 414/462–466; 70/259, 260, 237; 296/37.2

[56] References Cited

U.S. PATENT DOCUMENTS

| | | | |
|---|---|---|---|
| 1,094,084 | 4/1914 | Miller | 224/42.25 X |
| 2,819,004 | 6/1955 | Kubik et al. | |
| 3,343,736 | 9/1967 | Sellers | 224/42.06 |
| 3,362,597 | 10/1966 | Beach, Jr. | |
| 3,387,754 | 6/1967 | Sinkey et al. | |
| 3,425,605 | 2/1969 | Triboulet | 224/42.06 |
| 3,610,658 | 10/1971 | Sartori | 224/42.06 X |
| 3,613,971 | 10/1971 | Betz | 224/42.06 X |
| 4,312,620 | 1/1982 | Muschalek, Jr. | |
| 4,410,117 | 10/1983 | Crawford et al. | 224/42.21 X |
| 4,483,468 | 11/1984 | Lucas | 224/42.08 X |
| 4,484,699 | 11/1984 | Heck | 224/42.06 X |

FOREIGN PATENT DOCUMENTS 1085354 9/1980 Canada ........................... 224/42.06

Primary Examiner—Henry J. Recla
Assistant Examiner—Robert Petrik
Attorney, Agent, or Firm—Stanley G. Ade; Adrian D. Battison; Murray E. Thrift

[57] ABSTRACT

A support device for the spare wheel of a motor vehicle includes a box member attachable to a rear frame portion and including a front lockable cover to prevent access to interior bolts holding the box member on the frame. The box member includes an upstanding latch plate and carries pivotally on pivot pins through the side walls thereof, a support member including a cradle and an upstanding portion which has a slide movable vertically to engage behind the latch portion of the box member. The sides of the cradle include cut-outs so the cradle can wrap around the bumper and the slide engage behind the bumper onto the latch plate. The slide is lockable in position and the spare wheel sits in the cradle and can be locked to the upright. The device is therefore mounted entirely on the frame of the vehicle and is separate from the bumper and does not require any drilling or modification of the vehicle.

16 Claims, 5 Drawing Sheets

SUPPORT FOR A SPARE WHEEL OF A MOTOR VEHICLE

BACKGROUND OF THE INVENTION

This invention relates to a support device for the spare wheel of a motor vehicle and particularly but not exclusively for a motor vehicle of the type having a tail gate which can pivot about a horizontal axis to be raised and lowered for cargo access.

Various designs of device for this purpose have been provided, for example, in U.S. Pat. Nos. 4,312,620; 4,483,468; 3,362,597; 2,819,004; 3,387,754; 3,610,658. In addition, some designs have been put on the market and have been shown in various magazines.

However, generally, these designs require modifications to the basic vehicle including drilling holes in body parts, cutting parts of a bumper away and mounting a device, for example, on the bumper.

Various recent designs of a vehicle are available and often these include a support for a license plate which is positioned centrally of the bumper and slightly below the bumper which is also the location of a towing bracket which forms part of the vehicle.

It is highly undesirable in any equipment mounted on a vehicle after manufacture that any holes be drilled in the vehicle or the modifications made since these modifications will form the basis for corrosion and may cause distortion or other damage to the vehicle.

It is also highly desirable that a device of this type provides a highly attractive appearance so as not to detract from the design of the original vehicle, particularly bearing in mind the high cost of vehicles in the current market conditions.

Current vehicles such as the GMC Jimmy Range and similar vehicles such as the Blazer and Bronco have an area set aside inside the rear of the vehicle for receiving a spare wheel. However, this spare wheel can significantly reduce the cargo area since the spare wheel is mounted on top of the flat floor plate which defines the rear of the vehicle and in many cases defines the flat area with the folded down rear seats. Many users, therefore, often prefer to carry the spare wheel outside the vehicle on the roof, attached to the front or attached to a specially provided carrier at the rear of the vehicle. None of the devices currently available is entirely satisfactory since they do not provide the required attractive appearance and in many cases can cause damage to the vehicle structure when attached as a retrofit.

SUMMARY OF THE INVENTION

It is one object of the invention, therefore, to provide an improved attachment device for mounting the spare wheel of a vehicle rearwardly of the vehicle.

According to a first aspect of the invention, therefore, there is provided a support device for a spare wheel of a motor vehicle comprising a box member including two upstanding sides a transverse top, a transverse bottom, a hingedly mounted front cover movable from an open position exposing an interior of the box member to a closed position covering the box member and defining a front face thereof, a latch portion extending upwardly from the box member, a support member having a pair of sides each pivotally mounted on a respective side of the box member so as to be movable substantially through 90° from a lowered position to a raised support position, said support member defining a cradle having side members each arranged adjacent respective one of the sides of the box member and arranged such that said upstanding portion and cradle portion can receive and support a spare wheel and tire of the vehicle and a vertically slidable latch mounted on said upstanding portion and slidable to a position engaging a side of said latch portion to retain said support member in said raised position.

According to a second aspect of the invention, there is provided in a motor vehicle including a rear bumper, a bracket mounted on the vehicle beneath said rear bumper, an improvement comprising a carrier for a spare wheel for the motor vehicle comprising an attachment member mounted on said bracket beneath said bumper, a support member having a cradle and an upwardly projecting attachment portion mounted on said support member for pivotal movement about a horizontal axis from a lowered position to an upright raised position, said support member being shaped to extend from said attachment member upwardly around and over said bumper and including a latch portion movable from a raised position vertically downwardly behind said bumper to engage said attachment member.

The device has the advantage, therefore, that it provides a box device which can be mounted upon the tow bar underneath the bumper with a locking front cover which allows only the user to access the attachment bolts to prevent theft. The device can be readily pivoted on the attachment box with sides mounted on pivot pins projecting outwardly from the sides of the box. The support which carries the wheel includes sides which include a cut-out extending around the bumper and project to a position slightly forwardly of the bumper, that is between the bumper and the vehicle so that a latch member can extend into that position and latch against the attachment box so the whole unit is held on the frame of the vehicle and is separated from the bumper to prevent any vibration or damage to the bumper.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
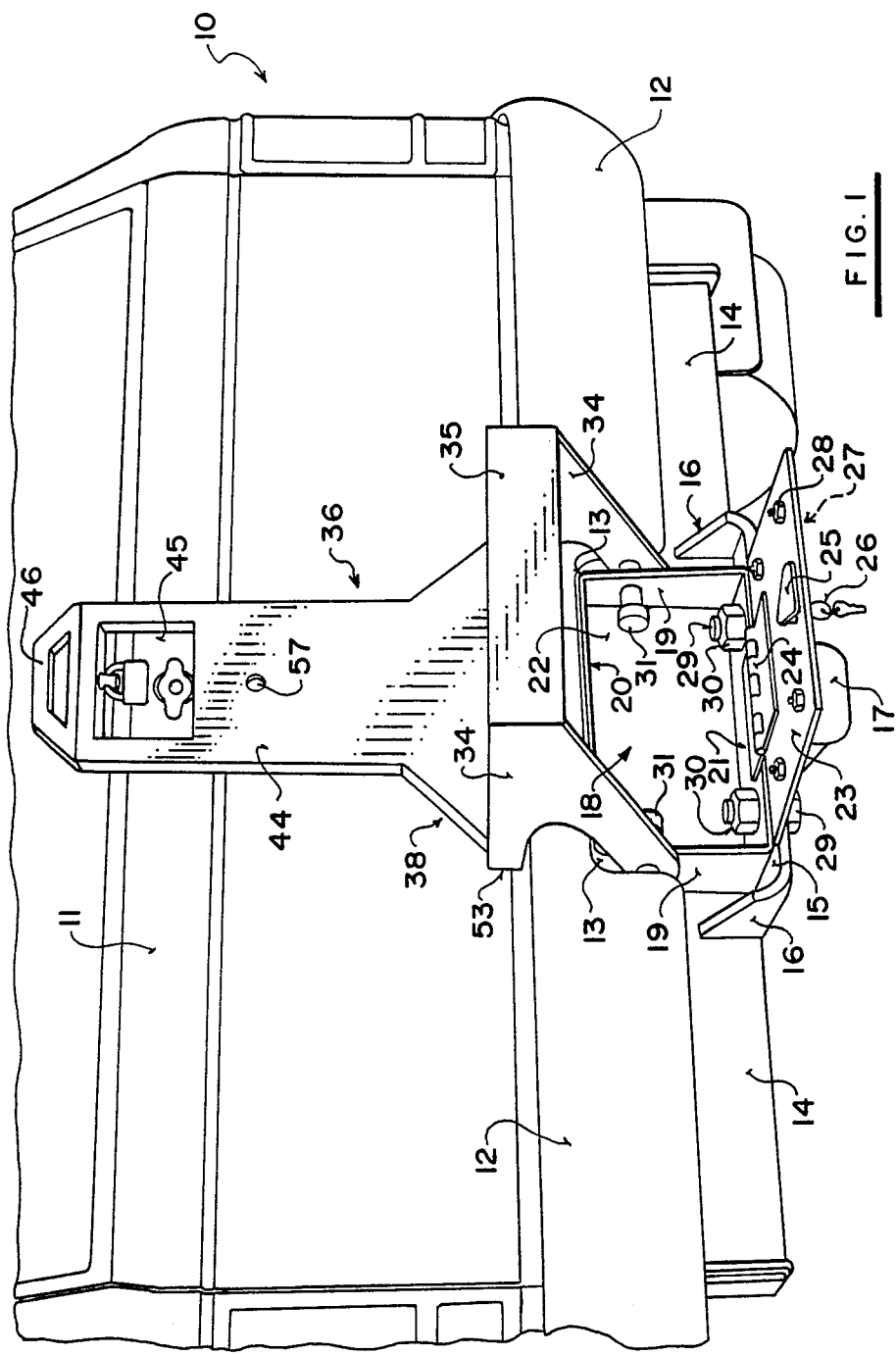
FIG. 1 is a rear isometric view of a spare wheel support device according to the invention in a raised latched position with the attachment box cover unlocked and opened to expose the interior.

In FIG. 1 there is shown the rear of a motor vehicle generally indicated at 10 which includes a tail gate 11 of the type which can be pivoted about a horizontal axis at a lower edge of the tail gate so as to be raised and lowered for cargo access. Furthermore, the rear of the vehicle includes a conventional bumper 12 formed of a folded sheet metal material and in the particular style of vehicle concerned, that is GMC Jimmy, there is a central recessed portion 13 of the bumper at which the bumper is reduced approximately to one-half of its depth at a portion of the order of 15 inches wide at the central section.

Beneath the bumper is provided a frame member 14 which carries a horizontal flange 15 reinforced by upturned portions 16. The horizontal flange forms part of a tow bar bracket indicated at 17. These parts of the vehicle as described above are conventional and the details can be found by inspection of any similar vehicle.

Normally, the spare wheel for the vehicle is carried inside the cargo compartment and is a significant restriction to normal use of that cargo compartment.

The present invention therefore provides the following device which is mounted on the vehicle without the necessity for extra drilled holes or other modifications to the vehicle and which firmly and rigidly supports the spare wheel on the outside of the vehicle immediately rearwardly of the tail gate.

Figure 2:
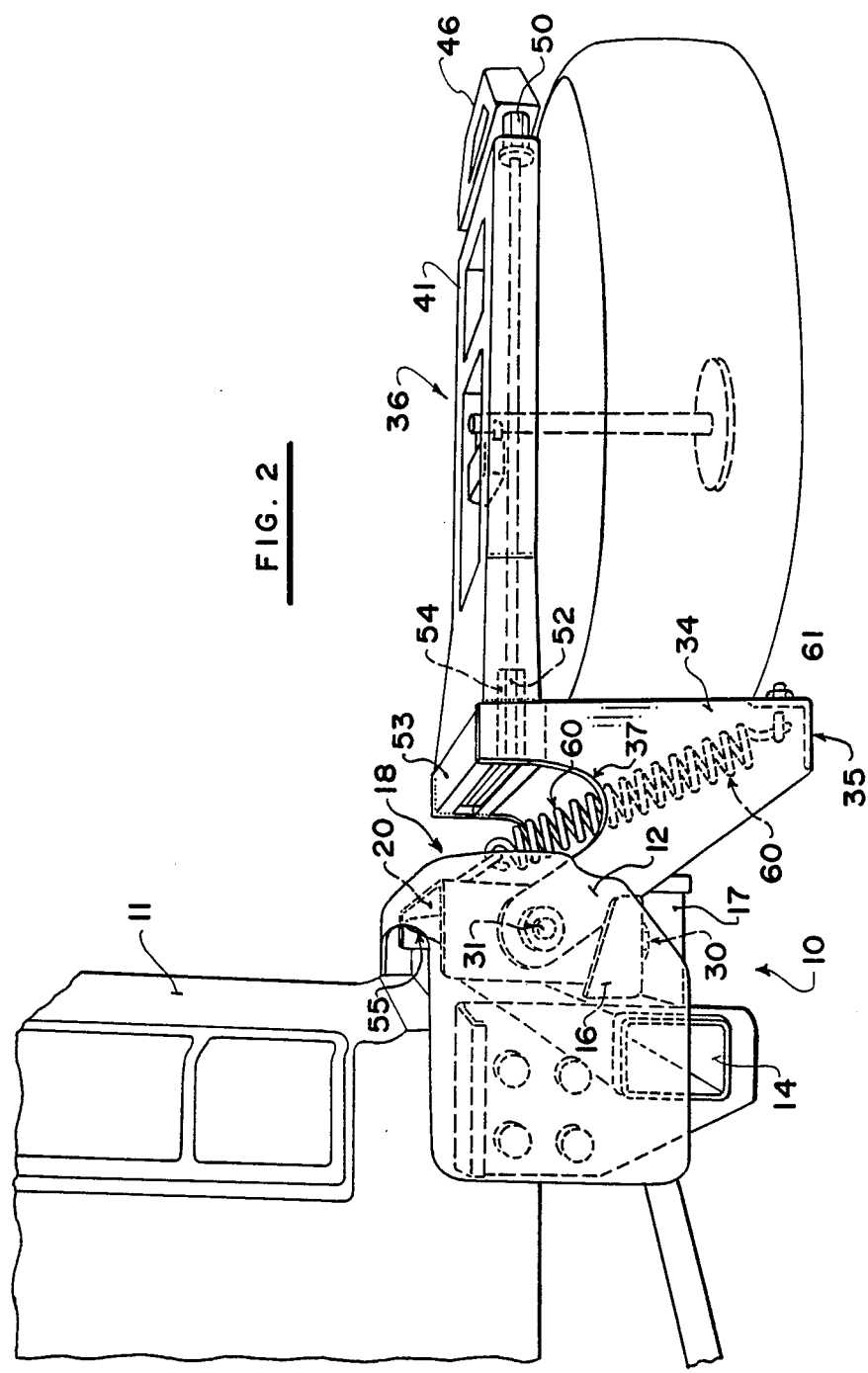
FIG. 2 is a side perspective view of the device of FIG. 1 with the wheel support unlatched and lowered and with the front box cover closed.

Thus, the device comprises a box member 18 which has sides 19, a top 20 and a base 21 thus defining a rectangular box shape. A rear plate 22 closes the rear of the box and provides structural strength. A front plate 23 is hingedly coupled at 24 to the bottom 21 so that it can pivot about a horizontal axis from a lowered position shown in FIG. 1 to a raised position shown in FIG. 2. A conventional lock arrangement 25 enables the front plate 23 to be locked in place in the closed position by a key-operated lock, the key indicated at 26. The dimensions of the box and therefore the front plate 23 are such that they will just receive a conventional license plate indicated at 27 in FIG. 2.

In will be appreciated that the license plate is normally mounted to the vehicle behind the box member 18 and thus must be removed from the vehicle before the box member is attached and then re-attached to the front cover plate 23 by way of the bolts indicated at 28.

Figure 3:
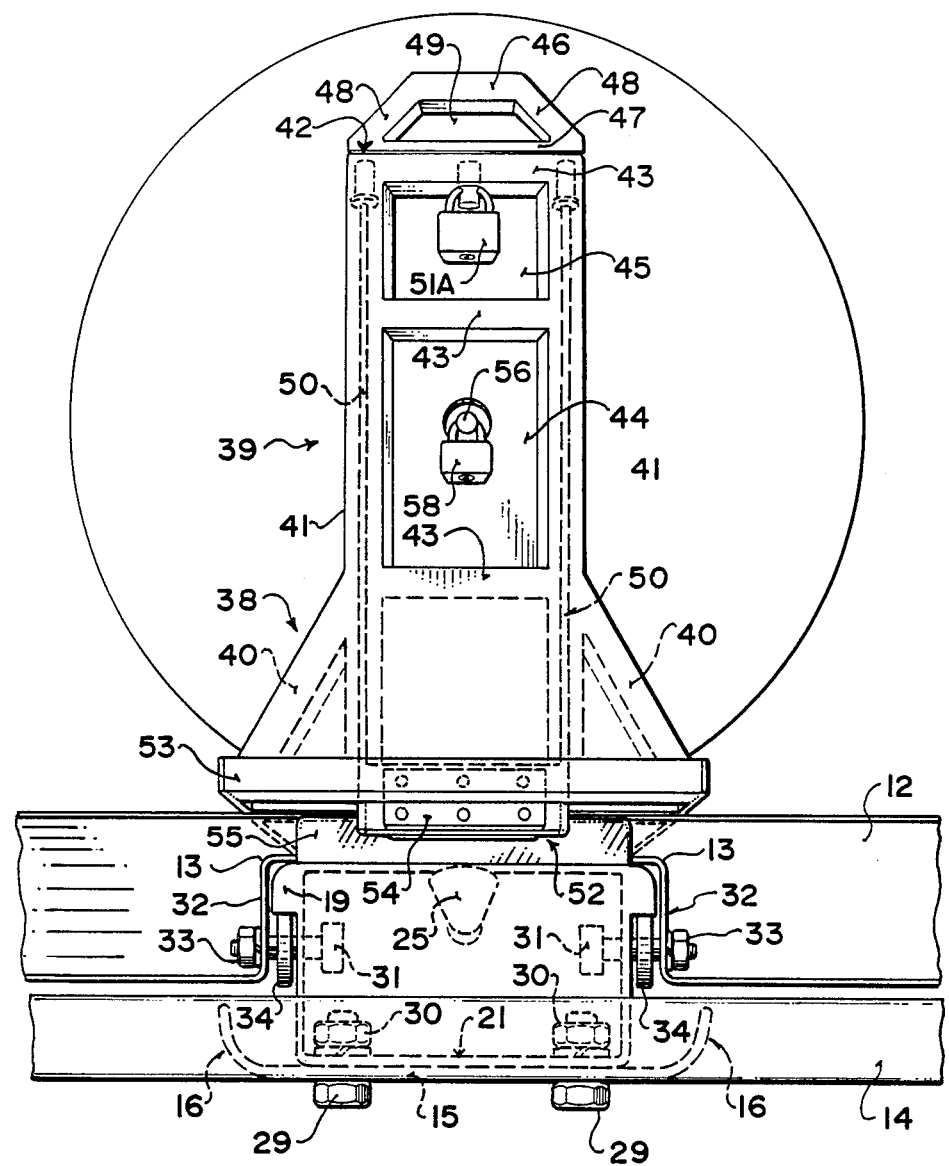
FIG. 3 is an elevational perspective view from a position forwardly of the device of FIG. 1 showing the support member in a latched position.

The box member 18 is attached to the vehicle by four bolts. Two of the bolts indicated at 29 pass through openings in the bottom 21 of the box and through the flange 15 as best shown in FIG. 3. The openings in the flange 15 are normally provided on the vehicle for attachment to a towing bracket and in this case are used to mount the box 18 without the necessity for any modification to the vehicle. The bolts are passed from the outside of the vehicle underneath the flange 15 into the box 18 and have screwed thereon nuts 30 which hold the box in place rigidly upon the flange 15. The nuts are of the type which lock onto the bolt and thus prevent the bolts from being inaccessible behind the locked cover plate 23 thus providing security for mounting of the box 18 on the vehicle.

In addition, the box 18 is attached to the vehicle by bolts 31 which pass through openings in the sides 19 of the box and through conventional or pre-existing openings provided in sides 32 of the central recess 13. The bolts have a short threaded portion at the remote end which receives a nut 33 so as to clamp the bolt to the sides 32 of the bumper. Inner parts of the bolts 31 act as bearing pins for pivotal movement of sides 34 of a support member generally indicated at 35 for receiving the spare wheel. The bolts 31 again are only accessible from inside the locked box member thus providing security for the attachment of the support member 35 to the box member.

The support member comprises the sides 34 together with a rear wall 35 and a front upstanding member generally indicated at 36. These cooperate to form an open top cradle section upon which the tire of the spare wheel can rest with the dimension front to rear of the cradle being sufficient to receive the lower portion of the tire within the cradle so that the tire rests on the upper edges of the sides 34.

Figure 5:
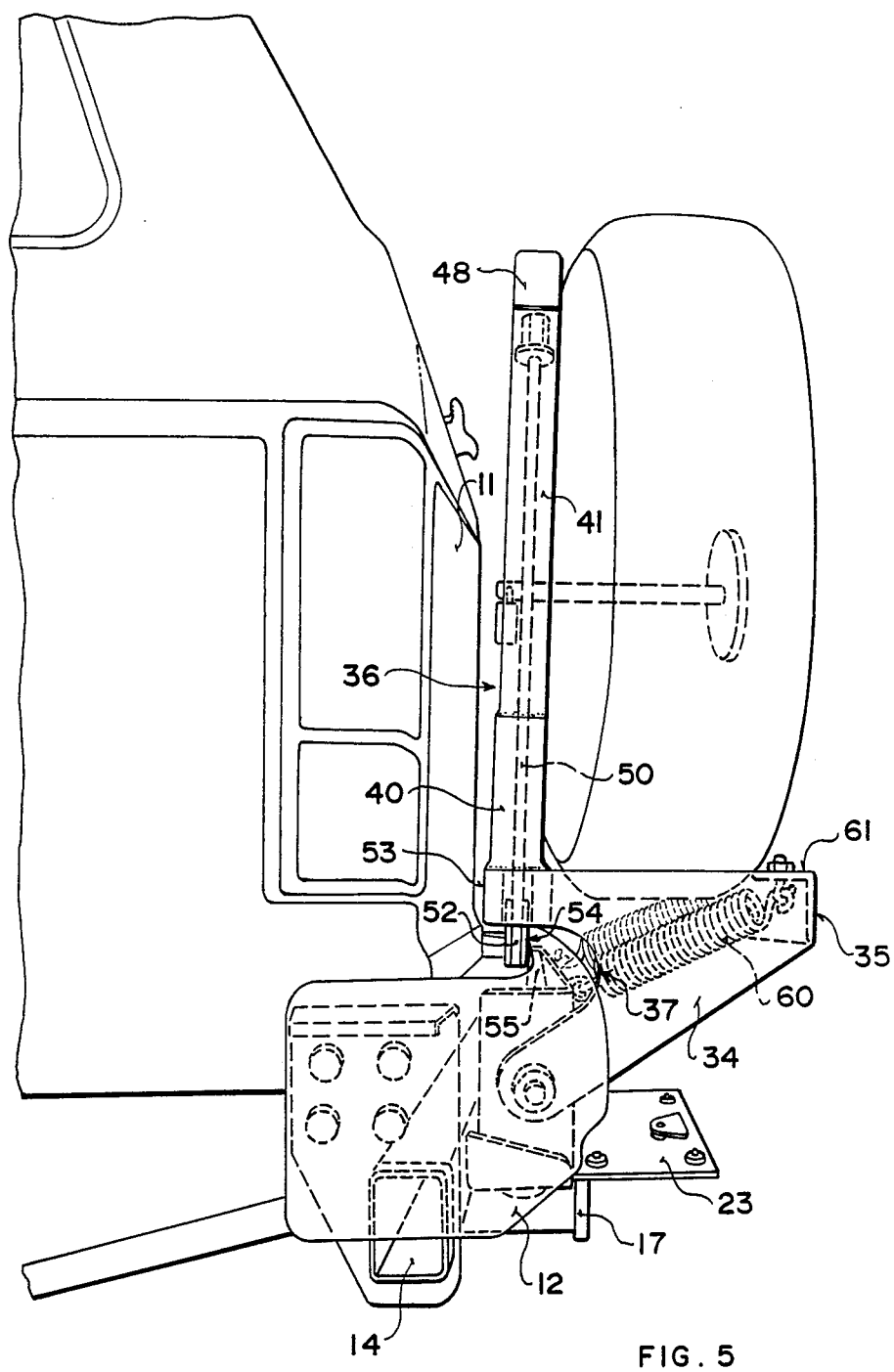
FIG. 5 is a side perspective view of the device showing the support in a raised position.

The sides 34 as best shown in FIG. 5 have a lower edge which is inclined upwardly and outwardly. An inner edge indicated at 37 is also inclined upwardly and outwardly and then curves around the bumper 12 to a position of the forward side of actuating the bumper. Thus, the sides define a cut-out which can wrap around the bumper in the raised position as shown in FIG. 5.

The upright portion as best shown in FIG. 3, includes a first portion which is tapered inwardly as indicated at 38 from the width of the cradle down to a narrower width portion indicated at 39. The tapered portion is defined by a pair of side rails 40 which are covered by a sheet thus defining effectively a closed section providing a smooth pleasing appearance. The portion 39 is defined by two rails 41 which extend from an upper end indicated at 42 through the lower inclined section to connect to upper ends of the rails 40. Three transverse rails 43 interconnect the side rails 41 to form a complete rectangular structure which is generally thinner than its width, defining a substantially flat plate. A sheet metal surface is provided on the outer side of the rails 41 as indicated at 44 in FIG. 1. The sheet metal plate leaves a first hole 45 in the upright portion. A handle is provided by two transverse rails 46, 47 and two inclined rails 48 which expose an opening 49 therebetween, the handle having a width substantially equal to the transverse width of the upright portion 39.

Figure 4:
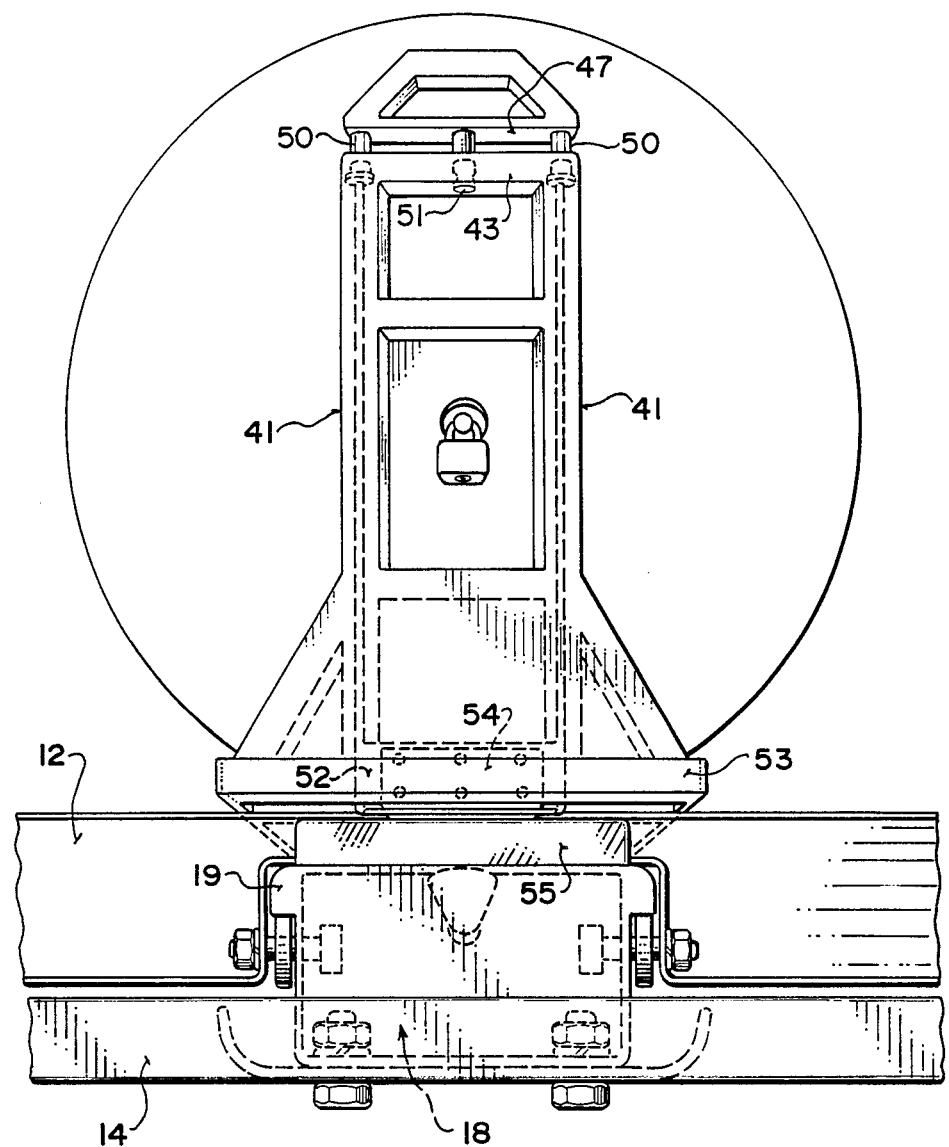
FIG. 4 is a view similar to that of FIG. 3 showing the support member in an unlatched position.

The handle as best shown in FIG. 4 carries a pair of rods 50 which are arranged for sliding movement along the rails 41 on the inside thereof upon manual force being applied to the handle in either an upward or downward direction as required.

A central rod 51 attached again to the bundle rail 47 extends through an opening in the upper rail 43 and includes a transverse opening for receiving a lock 51A which can lock the handle in the lowered position.

At a lower end of the actuating rods 50 there is carried a transverse plate 52 which is attached to each of the rods 50 at a respective end so as to be movable upwardly and downwardly therewith, within slots defined in an inner face of the rails 41. The upward extent of the slots limits the upward movement of the plate 52 to the position illustrated in FIG. 4 in which the lower edge of the plate lies flush with the underside of a lowermost transverse rail 53.

When the handle is lowered, the plate 52 is actuated by the rods 50 to take up the position illustrated in FIG. 3. It will be noted that the plate 52 has on opposed faces, hard rubber covers 54 which provide surface layers on the plate for engaging adjacent members. Specifically, a front face of one of the layers 54 engages an upstanding latch plate 55 which is attached to the upper face of the box member at an intermediate position thereon and, as shown in FIG. 5, extends upwardly therefrom to a position immediately rearward of the bumper section 12.

In the position shown in FIG. 3, therefore, the support member is latched into plate by the plate 52 and cover 54 so that it is held against pivotal movement about the pins 31, by engagement between the plate 52 and the upstanding latch plate 55. There is no engagement between the support member and the bumper and no strain applied to the bodywork of the vehicle at any point since the full support of the device is provided by the frame of the vehicle through the flange 15.

The spare wheel is attached to the support member by sitting in the cradle and by a bolt 56 passing through the spare wheel and through an opening 57 in the plate 44. A lock 58 can be applied to the bolt to provide security of attachment of the spare wheel to the support member.

A pair of springs 60 are coupled at transversely spaced positions so that one end of the spring is attached to a front upper edge of the box 18 and an opposed end of the spring is attached to a front flange 61 of the cradle. As shown in FIG. 5, the spring is in relaxed condition in a raised position of the support and in the lowered position shown in FIG. 2 the spring is extended also thus the spring provides a return force tending to lift the wheel and support into the raised position thus providing a manual assist.

If it is required to remove the support and spare wheel from the vehicle for preferred storage inside the vehicle, for example for greater security or at a time when extra storage area is not required, it is a simple matter to remove the cradle and support from the box member simply by opening the front cover 23 of the box member 18 and removing the bolts 31 which are thus available inside the box member. In addition the springs 60 can be simply unlatched from the loop members provided of the vehicle. The wheel, cradle and upright support can thus be simply retracted from the box member and inserted into the vehicle for storage.

The positioning of the box member and support centrally of the vehicle at the recess in the bumper ensures that the weight of the spare wheel is mounted centrally of the vehicle to avoid unbalancing the vehicle.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A support device for a spare wheel of a motor vehicle comprising a box member including two upstanding sides, a transverse top, a transverse bottom, a hingedly mounted front cover movable from an open position exposing an interior of the box member to a closed position covering the box member and defining a front face thereof, attachment means on said box member for attachment of the box member to the motor vehicle, a first latch member extending upwardly from the box member, a support member having a pair of sides, each of said sides on a respective side of the box member means mounting for pivotal movement relative thereto substantially through 90° from a lowered position to a raised support position, said support member defining a cradle portion and an upstanding plate portion with the cradle portion having side members each arranged adjacent respective one of the sides of the box member and arranged such that said upstanding portion and cradle portion can receive and support a spare wheel and tire of the vehicle and a vertically slidable second latch member mounted of said upstanding portion and slidable to a position engaging a side of said first latch member to retain said support member in said raised position.

2. The invention according to claim 1 wherein said attachment means includes means defining holes in said transverse bottom to attach said box member to a towing bracket of the motor vehicle.

3. The invention according to claim 1 wherein in said attachment means includes means defining holes in the upstanding sides such that said box member can be bolted to a bumper of the vehicle.

4. The invention according to claim 1 wherein said attachment means includes bolt members provided inwardly of said front cover member and wherein there is provided a lock for locking said front cover member such that said bolt members are secured.

5. The invention according to claim 1 wherein said pivotal mounting means includes means defining holes in said upstanding sides of said box member and bolt members for bolting through said holes into a bumper of the vehicle, said bolt members acting as pivots upon which said support member is pivotally mounted.

6. The invention according to claim 5 wherein said cradle portion includes a pair of sides each for interconnecting the cradle portion to a respective one of the upstanding sides of the box member, said sides having a front edge defining a cut-out portion above a respective one of said bolt members such that said front edge extends rearwardly in use around a bumper and then forwardly to a position between the bumper and the vehicle.

7. The invention according to claim 1 wherein said upstanding portion has a thickness transverse to the bumper which is very much less than a dimension thereof longitudinal of the bumper so as to define a substantially flat plate member with a first hole therein defining a handle in said vertically slidable latch member and means for locking said vertically slidable latch member in a latched position thereof.

8. The invention according to claim 1 wherein said cover member is rectangular and dimensioned just to receive a license plate.

9. In a motor vehicle including a rear bumper, a bracket mounted on the vehicle beneath said rear bumper, an improvement comprising a carrier for a space wheel for the motor vehicle comprising an attachment member mounted on said bracket beneath said bumper, a support member having a cradle portion defining surfaces to engage and support a periphery of a spare wheel and an attachment portion arranged to project from said cradle portion at right angles to said surface said support members being mounted on said attachment member for pivotal movement about a horizontal axis from a lowered position in which the attachment portion lies substantially horizontal to an raised position in which the attachment portion is substantially vertical, said support member being shaped to extend from said attachment member upwardly around and over said bumper and including a latch member movable from a raised position vertically downwardly behind said bumper to engage said attachment member.

10. The invention according to claim 9 wherein said attachment member comprises a box member having a horizontal top wall, a horizontal bottom wall and vertical sides, said vehicle including a horizontal towing bracket, said bottom wall being bolted to said towing bracket.

11. The invention according to claim 10 wherein said box member has means defining holes in the vertical sides of said box member, the vehicle includes a bumper having vertical walls thereof, and said vertical sides of the box member are bolted to said vertical cradle of the bumper.

12. The invention according to claim 11 wherein said box member includes a front cover member and is bolted to said vehicle by bolts provided inwardly of said front cover member and includes a lock for locking said front cover member such that said bolts are secured.

13. The invention according to claim 10 including means defining holes in said vertical sides of said box member and bolt members for bolting through said holes into a bumper of the vehicle, said bolt members acting as pivots upon which said support member is pivotally mounted.

14. The invention according to claim 11 wherein said cradle portion includes a pair of sides each for interconnecting the cradle portion to a respective one of the vertical sides of the box member, said sides of said cradle portion having an edge defining a cut-out portion above a pivot member such that said edge extends in use around said bumper and then to a position between the bumper and the vehicle.

15. The invention according to claim 14 wherein said attachment portion has a thickness transverse to the bumper which is very much less than a dimension thereof longitudinal of the bumper so as to define a substantially flat plate member with a first hole therein defining handle in said latch member and means for locking said latch member in a latched position thereof.

16. The invention according to claim 12 wherein said front cover member is rectangular and dimensioned just to receive a license plate.

* * * * *